United States Patent [19]

Kyo et al.

[11] 4,206,100

[45] Jun. 3, 1980

[54] RESIN COMPOSITION

[75] Inventors: Kayomon Kyo, Kyoto; Nakaba Asahara; Yasuhiko Asai, both of Uji; Isamu Hirose, Kyoto; Kenichirou Nakamoto, Uji, all of Japan

[73] Assignee: Unitika Ltd., Amagasaki, Japan

[21] Appl. No.: 967,532

[22] Filed: Dec. 7, 1978

[30] Foreign Application Priority Data

Dec. 7, 1977 [JP] Japan .................................. 52-147457

[51] Int. Cl.$^2$ .......................... C08K 5/09; C08K 3/32; C08K 3/30; C08K 3/26
[52] U.S. Cl. .............................. 260/22 R; 260/40 P; 260/40 R; 260/45.75 R; 260/45.75 A; 260/45.75; 260/45.75 E; 260/45.75 C; 260/45.75 N; 260/45.75 B; 260/45.75 F; 260/45.75 G; 260/45.75 M; 260/45.75 P; 260/45.75 V; 260/45.75 W; 260/45.75 T; 260/45.75 R; 260/45.75 ST; 525/425
[58] Field of Search ............. 260/857 PE, 860, 45.75, 260/40 R, 40 P, 22 R, 45.7 R, 45.7 ST; 525/425

[56] References Cited

U.S. PATENT DOCUMENTS

| 3,884,990 | 5/1975 | Sakata et al. ...................... 260/860 |
| 4,064,196 | 12/1977 | Hazama .............................. 260/860 |
| 4,070,332 | 1/1978 | Morikawa et al. ................ 260/40 R |
| 4,097,431 | 6/1978 | Asahara et al. .................... 260/860 |
| 4,123,420 | 10/1978 | Kyo et al. ......................... 260/860 |

Primary Examiner—V. P. Hoke
Attorney, Agent, or Firm—Sughrue, Rothwell, Mion, Zinn and Macpeak

[57] ABSTRACT

A resin composition consisting essentially of
 (A) an aromatic copolyester derived from (1) a mixture of terephthalic acid and isophthalic acid and/or the functional derivatives thereof and (2) a bisphenol and/or the functional derivatives thereof;
 (B) a polyamide; and
 (C) a compound of a metal of Groups IVB, VB, VIB, VIIB, VIII, IB, IIB, IIIA, IVA or VA of the Periodic Table.

An article molded from the resin composition exhibits high heat resistance, mechanical properties and moldability. It is particularly resistant to cracking upon impact, and is also resistant to breaking at a thin walled portion.

28 Claims, 4 Drawing Figures

RESIN COMPOSITION

BACKGROUND OF THE INVENTION

1. Field of the Invention

This invention relates to a resin composition with improved mechanical characteristics, and more particularly, to a resin composition with improved mechanical characteristics that comprises an aromatic polyester copolymer, polyamide and a specified metal compound.

2. Description of the Prior Art

An aromatic polyester copolymer prepared from terephthalic acid and isophthalic acid or functional derivatives thereof and a bisphenol or functional derivatives thereof is a heat resistant, thermoplastic resin having high heat distortion temperature and high heat decomposition temperature as well as good mechanical and electrical properties. It is widely used in fields where engineering plastics of high quality are required. However, because of high heat distortion temperature, it is less moldable than other thermoplastic resins; for instance, making an injection molded article of it requires high molding temperature and injection pressure whereas the resulting molded article often develops a sink mark, flow mark or excessive internal strains.

Molded articles with sink marks, flow marks or excessive internal strains are not only poor in appearance but are greatly affected in mechanical properties so it frequently occurs that the excellent performance of the resin from which they are molded will not be exhibited to the fullest. Depending on the kind of molded articles, the flow length is sometimes insufficient to provide a perfect product. Therefore, it has been required that good engineering plastics be excellent not only in various properties but in moldability also. However, it is also known well that a polymer blend intended to improve the moldability of a heat resistant engineering plastic tends to decrease its heat distortion temperature. Furthermore, while an aromatic polyester copolymer has the advantages mentioned above, it can only be used in limited applications because of insufficiency in resistance to organic solvents.

Polyamides are very excellent in resistance to organic solvents, wear resistance and moldability, but they are not adequately heat resistant as typified by polycaprolactam and polyhexamethylene adipamide which have a heat distortion temperature of 56° C. and 59° C., respectively. As a further disadvantage of polyamides, they have high hygroscopicity and are known to be subject to dimensional variation, changes in mechanical performance and reduction in electrical properties.

A resin composition comprising an aromatic polyester copolymer and polyamide has considerably higher heat distortion temperature than a polyamide as well as has adequately higher moldability and solvent resistance than an aromatic polyester copolymer. The improvement so much exceeds what is presumed an additive effect from the proportion of the two polymers that constitute the resin composition. Therefore, the resulting composition has every useful property in that it retains not only the excellent tensile strength, bend recovery characteristics and dimensional stability of the aromatic polyester copolymer but the high crack resistance and wear resistance of the polyamide (see Japanese Patent Application (OPI) Nos. 4146/75 (The term "OPI" as used herein refers to a "published unexamined Japanese patent application") and 98765/77).

It turned out, however, that articles made by, for example, injection molding of a resin composition comprising an aromatic polyester copolymer and polyamide had the following defects: the molded article easily breaks at a thin-walled portion such as gate or at a long narrow rod-like projection especially when it is absolutely dry, thus, imposing limitations on practical application such as when the article is released from the mold as well as when the product design is to be decided. What is more, even a relatively thick-walled article easily cracks upon impact such as a drop impact and a falling-ball impact especially when it is absolutely dry. All these phenomena constitute a considerable limitation on the usefulness of such resin compositions.

Examples of prior art resin compositions that comprise an aromatic polyester and metal compound include Japanese Patent Application (OPI) No. 51048/73 which uses an Sn compound for improving the heat resistance and light resistance of the resulting resin composition, Japanese Patent Application (OPI) No. 51152/75 which uses a variety of metal soaps for improving the moldability of the composition, Japanese Patent Application (OPI) No. 152953/77, Japanese Patent Application (OPI) No. 152954/77 (corresponding to U.S. Ser. No. 860,411) and Japanese Patent Application (OPI) No. 16558/77 (corresponding to U.S. Pat. No. 4,097,431) all of which use metal salts of carboxylic acid to prevent occurrence of water crazing.

It is known to incorporate a variety of Cu compounds into a polyamide as an agent for providing heat resistance. However, no example has been known of incorporating a metal compound into a resin composition of aromatic polyester copolymer and polyamide nor has the effect of such incorporation been known.

SUMMARY OF THE INVENTION

Therefore, one object of this invention is to provide a resin composition with improved mechanical characteristics that comprises an aromatic polyester copolymer and polyamide.

Another object of this invention is to provide a resin composition of an aromatic polyester copolymer and polyamide which produces a molded article having improved impact characteristics and brittleness at thin-walled portions.

Other objects of this invention will be apparent as the following description will proceed.

As a result of studies for eliminating the defects mentioned above of the conventional resin composition, the present inventors established reliable methods of evaluating the bend strength of a thin-walled portion and impact strength that faithfully reproduce the bending of an actual molded article or impacts applied thereto. Based on these techniques, the present inventors continued their studies and found that the defects of the conventional resin composition can be corrected satisfactorily by incorporating a specific metal compound into a resin composition comprising an aromatic polyester copolymer and polyamide.

According to the present invention, there is provided a resin composition comprising (A) an aromatic copolyester (hereinafter referred to as "PPES", for brevity) comprising the reaction product in about equimolar amounts of (1) terephthalic acid and isophthalic acid and/or the functional derivatives thereof (the terephthalic acid unit/isophthalic acid unit molar ratio being about 9:1 to about 1:9) and (2) a bisphenol of the following general formula (I):

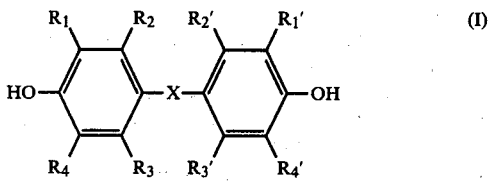

wherein —X— represents a member selected from the group consisting of —O—, —S—, —SO$_2$—, —SO—, —CO—, an alkylene group containing 1 to 5 carbon atoms, and an alkylidene group containing 1 to 5 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 5 carbon atoms, and/or a derivative thereof.

(B) a polyamide (hereinafter referred to as "PA", for brevity) containing therein a repeating unit of the following general formula (II):

or (III):

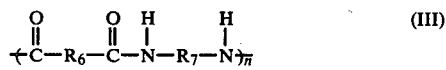

wherein $R_5$, $R_6$ and $R_7$, which may be the same or different, each represents an alkylene group containing 4 to 11 carbon atoms and n is an integer of from 30 to 500, and (C) a compound of a metal of groups IVB, VB, VIB, VIIB, VIII, IB, IIB, IIIA, IVA, or VA of the Periodic Table.

DETAILED DESCRIPTION OF THE INVENTION

Figure 1:
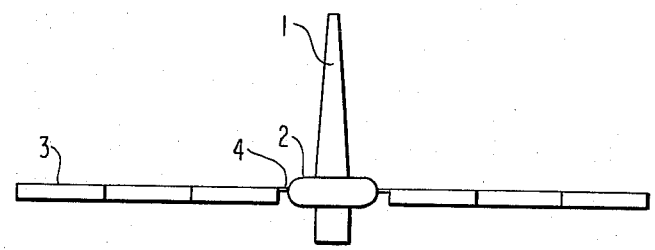
FIG. 1 is a front view of a test piece for testing the bend strength of a gate.

The PPES used in this invention is obtained from a mixture of terephthalic acid and isophthalic acid and/or the functional derivatives thereof (the terephthalic acid unit/isophthalic acid unit molar ratio being about 9:1 to about 1:9) and a bisphenol of the following general formula (I):

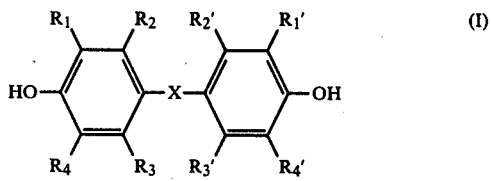

wherein —X— is selected from the group consisting of —O—, —S—, —SO$_2$—, —SO—, —CO—, an alkylene group containing 1 to 5 carbon atoms and an alkylidene group containing 1 to 5 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 5 carbon atoms, and/or a functional derivative thereof.

Suitable examples of alkylene groups for X containing 1 to 5 carbon atoms include a methylene group, an ethylene group, a propylene group, a tetramethylene group and a pentamethylene group. Suitable examples of alkylidene groups for X containing 1 to 5 carbon atoms include an ethylidene group, a propylidene group, an isopropylidene group, an isobutylidene group and a pentylidene group.

Suitable examples of alkyl groups for $R_1$ to $R_4$ and $R_1'$ to $R_4'$ containing 1 to 5 carbon atoms include straight and branched chain alkyl groups such as a methyl group, an ethyl group, an isopropyl group, a tert-butyl group and a neopentyl group.

A mixture of about 90 to about 10 mol% of terephthalic acid and/or the functional derivatives thereof and about 10 to about 90 mol% of isophthalic acid and/or the functional derivatives thereof is used as an acid component to be reacted with the bisphenol to prepare the PPES used in this invention. Preferably, a mixture of 30 to 70 mol% of terephthalic acid and/or the functional derivatives thereof and 70 to 30 mol% of isophthalic acid and/or the functional derivatives thereof is used. PPES prepared from a bisphenol having the general formula (I) (hereinafter simply "bisphenol" for brevity) and a mixture of 50 mol% of terephthalic acid and/or the functional derivatives thereof and 50 mol% of isophthalic acid and/or the functional derivatives thereof is most preferred. The molar ratio of the bisphenol to the sum of the terephthalic acid units and isophthalic acid units is substantially equimolar, e.g., about 1:0.95 to 1:2, preferably about 1:1, most preferably 1:1.

Examples of functional derivatives of terephthalic or isophthalic acid which can be used in this invention include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of these acids containing 1 to 6 (especially 1 to 2) carbon atoms in each alkyl moiety thereof. Preferred examples of diaryl esters include diphenyl terephthalate and diphenyl isophthalate.

Examples of suitable bisphenols which can be used are 4,4'-dihydroxy-diphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. 2,2-Bis(4-hydroxyphenyl)propane, bisphenol A is most typical, is easily available, and, accordingly, is most often used.

Typical examples of the functional derivatives of the bisphenol which can be used are the alkali metal salts and diesters thereof with aliphatic monocarboxylic acids containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters thereof. The bisphenol can be used either individually or as a mixture of two or more thereof.

In the preparation of the aromatic copolyester from terephthalic acid or isophthalic acid or the functional derivatives thereof and the bisphenol, at most 30 mol%, preferably at most 10 mol%, of a compound having a carbonate linkage such as diphenyl carbonate or an aliphatic glycol such as ethylene glycol, propylene glycol, tetramethylene glycol or neopentyl glycol may also be copolymerized therewith to improve the moldability of the polymer and in the melt polymerization the carbonate linkage acts as a catalyst.

To produce the aromatic copolyester used in this invention, the interfacial polymerization method which comprises mixing a solution of an aromatic dicarboxylic acid chloride in a water-immiscible organic solvent with an alkaline aqueous solution of bisphenol, the solution polymerization method which comprises heating bisphenol and an acid chloride in an organic solvent, and the melt polymerization method which comprises heating a phenyl ester of an aromatic dicarboxylic acid and bisphenol, which are described in detail in U.S. Pat. Nos. 3,884,990 and 3,946,091, can, for example, be employed. The production of aromatic copolyesters is also described in detail in U.S. Pat. No. 4,052,481.

In order to insure good physical properties for the aromatic copolyesters used in this invention, they should have a logarithmic viscosity number ($\eta_{inh}$), defined by the following equation, of about 0.3 to about 1.5, preferably 0.4 to 0.8.

$$\eta_{inh} = (\log_e t_1/t_2)/C$$

wherein $t_1$ is the falling time (in seconds) of a solution of the aromatic copolyester; $t_2$ is the falling time (in seconds) of the solvent; and C is the concentration (g/dl) of the aromatic copolyester in the solution. The logarithmic viscosity number used herein is determined in a 1,1,2,2-tetrachloroethane-phenol mixture (weight ratio: 4:6) at 25° C.

The PA, one component of the resin composition of this invention, is a compound having therein a repeating unit represented by the following general formula (II):

   (II)

or (III):

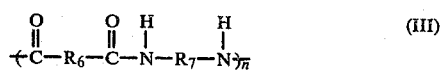   (III)

wherein $R_5$, $R_6$ and $R_7$, which may be the same or different, each represents an alkylene group having 4 to 11 carbon atoms, and n is an integer of 30 to 500. Some of the alkylene groups (e.g., $R_5$, $R_6$ and $R_7$) may be replaced by aromatic groups, e.g.,

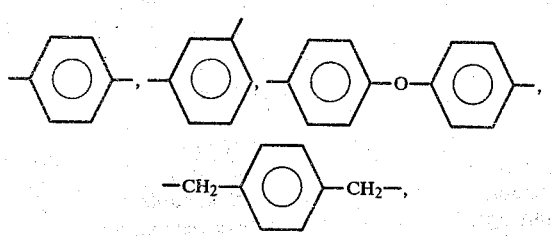

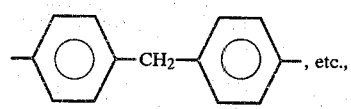, etc., or alicyclic groups, e.g., 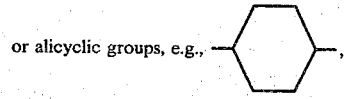,

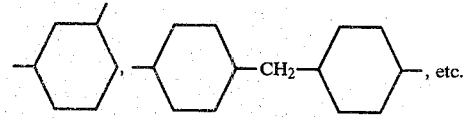, etc.

Suitable examples of alkylene groups containing 4 to 11 carbon atoms for $R_5$ to $R_7$ include a tetramethylene group, a pentamethylene group, a hexamethylene group, a heptamethylene group, an octamethylene group, a nonamethylene group, a decamethylene group, and an undecamethylene group.

Any PA which contains a repeating unit represented by either of the above general formulae (II) and (III) can be used in this invention and there is no further limitation. Preferred examples of the PA include polyhexamethylene adipamide, polycaprolactam, polyhexamethylene sebacamide, polydecamethylene adipamide, polyaminoundecanoic acid, and polylaurolactam.

Copolyamides can also be used as the PA in this invention. Examples of suitable copolyamides include a copolyamide derived from caprolactam and hexamethylene adipamide, and a copolyamide derived from caprolactam and hexamethylene sebacamide.

The proportion of (A) PPES to (B) PA as constituents of the resin composition of this invention is in the range (by weight) from about 1:9 to about 9:1, preferably from 3:7 to 7:3. If the proportion is controlled to be in the above specified range, the resin composition obtained exhibits equally high levels of heat distortion temperature, moldability and solvent resistance.

The metal compound to be used as one of the constituents of the resin composition of this invention is a compound of a metal selected from Groups IVB, VB, VIB, VIIB, VIII, IB, IIB, IIIA, IVA and VA, preferably from Groups IB, IIB, IIIA, IVA and VA of the Periodic Table. Specific examples of such metals are copper, silver, zinc, cadmium, mercury, aluminum, tin, lead, antimony, bismuth, nickel, cobalt, iron, manganese, molybdenum, vanadium, and titanium. Among examples of metal compounds are halides or oxides of the above specified metals, compounds of such metals with inorganic acids such as sulfuric acid, nitric acid, carbonic acid and phosphoric acid, and compounds of such metals with organic acids. Suitable organic carboxylic acids which can form the metal compound used in the present invention include aliphatic carboxylic acids, alicyclic carboxylic acids, aromatic carboxylic acids and the like. Suitable organic carboxylic acids further include monocarboxylic acids and polycarboxylic acids containing up to 4 carboxyl groups. Of these, monocarboxylic and dicarboxylic acids are preferred. Specific examples of aliphatic monocarboxylic acids are formic acid, acetic acid, propionic acid, butyric acid, pentanoic acid, hexanoic acid, heptanoic acid, octanoic acid, pelargonic acid, capric acid, lauric acid, myristic acid, palmitic acid and stearic acid. A specific example of an alicyclic monocarboxylic acid is cyclohexanecarboxylic acid. Specific examples of aromatic monocarboxylic acids are phenylacetic acid and benzoic acid, with formic acid, acetic acid, stearic acid, benzoic acid and lauric acid being preferred. Specific examples of aliphatic dicarboxylic acids are malonic acid, succinic acid, suberic acid, glutaric acid, adipic acid and azelaic acid, a specific example of an alicyclic dicarboxylic acid is cyclohexanedicarboxylic acid, and specific examples of aromatic dicarboxylic acids are terephthalic acid, isophthalic acid and naphthalenedicarboxylic acid. Trimellitic acid is an example of a tricarboxylic acid which can be used, and pyromellitic acid is an example of a tetracarboxylic acid which can be used. Halides or oxides of such metals are preferred; compounds, particularly halides of copper, silver and zinc exhibit the best effect, and compounds of aluminum, tin, titanium and antimony exhibit the next best effect. Specific examples of preferred metal compounds include cuprous chloride, cupric chloride, cuprous bromide, cupric bromide, cuprous iodide, cupric iodide, cuprous oxide, cupric oxide, copper phosphate, silver chloride, silver bromide, silver iodide, silver oxide, zinc chloride, TiO, $Ti_2O_3$, $TiO_2$, $Sb_2O_3$, and $Sb_2O_5$. These metals can be used as a mixture of two or more in this invention.

If copper compounds are incorporated in the resin composition of this invention, not only are the mechanical characteristics of a molded article, especially impact strength of brittleness at thin-walled portion, improved but coloration due to exposure of the article to high temperature is prevented accompanied by noticeably improved durability of the mechanical characteristics. However, if more than about 0.005 wt% of a copper compound is used, the composition turns blue upon absorption of water, thus impairing the appearance and posing difficulties in giving the composition a desired color tone with dyes or pigments. Therefore, it has been practically impossible to use a copper compound in an amount necessary and sufficient for providing the resin composition with adequate mechanical characteristics and heat resistance. However, it has been discovered by the present inventors that using both a Cu compound and a compound of a metal of Group V, especially an Sb compound, and amongst other things, $Sb_2O_3$, curiously enough prevents bluing of a copper compound without impairing the effect it has of improving the mechanical characteristics and heat resistance of the composition. Therefore, combination of a copper compound with Sb compound is considered a preferred combination of metal compounds in this invention.

The metal compound is incorporated in the resin composition of this invention in an amount ranging from about 0.001 to about 25 parts by weight per 100 parts by weight of the sum of (A) PPES and (B) PA. Optimum level of addition of metal compounds may vary with the kind of metal compounds; and some, $Sb_2O_3$ and $TiO_2$, for example, prove effective if they are used in a relatively large amounts; from about 0.1 to about 15 parts by weight of $Sb_2O_3$, or from about 2 to about 25 parts by weight, preferably from 5 to 25 parts by weight, more preferably 10 to 25 parts by weight, of $TiO_2$ provides a gate with increased bend strength. For metal compounds other than the compounds as described above, generally, the amount incorporated is an amount ranging from about 0.001 to about 5 parts by weight, preferably from 0.01 to 0.5 part by weight, per 100 parts by weight of the sum of (A) PPES and (B) PA. In general, if 0.001 part by weight are not reached, the effect of this invention is not achieved to the fullest whereas if 5 parts by weight are exceeded, the mechanical characteristics of the resulting resin composition may be deteriorated contrary to the intended purpose of this invention.

It has also been found by the present inventors that using at least about 10 parts by weight based on 100 parts by weight of the sum of (A) PPES and (B) PA, especially at least 15 parts by weight of titanium dioxide provides interesting effects not only of improving the mechanical characteristics of a resin composition comprising PPES and PA but of correcting satisfactorily the nature of the resin composition so that it may not turn yellow upon exposure to ultraviolet rays as well as of significantly increasing the heat distortion temperature of the resin composition. A white resin composition comprising PPES, PA and at least about 10 parts by weight of $TiO_2$ per 100 parts of the sum of PPES and PA is also provided with light shielding property, thus finding a wide variety of utility including light reflectors and shields. This fact is surprising indeed since a resin incorporating inorganic matter generally provides a molded article which is brittle and easily breaks at a thin-walled portion such as gate. The exact mechanism of the advantage described above of this invention cannot be elucidated but, most probably, some kind of chemical linkage is formed between the resin and metal compound as a result of heat treatment applied during the procedure of molding such extrusion or injection.

Any method can be used to mix the constituent (A) with (B) for preparing the resin composition of this invention as long as they are dispersed in a substantially uniform manner. If constituent (A) is less than (B) in weight ratio, it is preferable to mix part of (B) with (A) first, followed by addition of the remaining (B). Incomplete mixing or a heterogenous dispersion should be avoided because each constituent forms a relatively large agglomerate which impairs the mechanical characteristics of the resin composition obtained.

The metal compound of this invention can be incorporated into the resin composition by, for example, adding it in the course of preparing constituent (A) or (B) through polymerization or by adding the same during blend extrusion of the constituents (A) and (B). Alternatively, the metal compound may be added to a resin composition prepared from the constituents (A) and (B), which is then subjected to another extrusion of shaped by injection molding. The metal compound may be added portion-wise by distributing it among the various stages described above. It is also possible to have a majority of the metal compound be included in whichever of constituent (A) or (B). In any event, for the resin composition to develop the desired mechanical characteristics, it seems advantageous to hold the composition at about 220° to about 340° C., preferably 240° to 320° C., for about 1 second to 30 minutes, preferably about 5 seconds to 10 minutes sometime in the course up to production of a final shaped article.

If desired, to improve the thermal stability of the resin composition of this invention, various thermal stabilizers such as amine compounds, phosphorus compounds, and hindered phenols can be added thereto. Usually the thermal stabilizers are used in an amount of about 0.01 to about 5% by weight based on the weight of the resin composition.

Various weather resisting agents can be added to the resin composition of this invention to improve the weatherability thereof. Examples of suitable weather resisting agents include benzotriazole derivatives and benzophenone derivatives. Particularly preferred examples of these compounds are 2-(2'-hydroxy-5'-methylphenol)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, etc. Usually the weather resisting agent is used in an amount of about 0.01 to about 5% by weight based on the weight of the resin composition.

A phosphorus compound such as an orthophosphoric ester, an acid orthophosphoric acid, orthophosphoric acid, a phosphorous ester, an acid phosphorous ester or phosphorous acid, when added in an amount of 0.01 to 0.5% by weight based on the total weight of the resin composition, produces good results as a coloration inhibitor.

If desired, ordinary reinforcing fillers, such as glass fibers, inorganic silicates, silica, quartz, silica gel, carbon fibers, cristobalite, asbestos, clay or talc, may also be incorporated in the resin composition of this invention. A suitable amount of these reinforcing fillers ranges from about 1 to about 50% by weight based on the weight of the resin composition.

Furthermore, in order to further improve the mechanical properties, such as impact strength or elongation at break, of the resin composition of this invention, it is possible to add a rubber such as acrylonitrile-butadiene rubber or styrene-butadiene rubber, an acrylonitrile/butadiene/styrene (ABS) resin, a polycarbonate, polyethylene, polypropylene, a polyurethane, polystyrene, EVA copolymers, poly(acrylates), polytetrafluoroethylene, or poly(methyl methacrylate) to the resin composition. A suitable amount of these rubbers or polymer materials which can be used is about 1 to about 30% by weight, preferably about 1 to about 10% by weight, based on the weight of the resin composition.

If desired, fire retardants or fire retardant aid may be used. Suitable fire retardants are aromatic halides, and especially decabromodiphenyl ether is preferred. A preferred fire retardant aid is $Sb_2O_3$. The amount of each agent to be added ranges from about 0.5 to about 40 wt%, preferably from 0.1 to 20 wt% based on the total weight of the resin composition.

The resin composition of this invention exhibits high heat resistance, mechanical properties and moldability. An article molded from the composition is resistant to cracking upon impact and the article is also resistant to breaking at a thin-walled portion. As a further advantage, the resin composition of this invention is more resistant to high temperature than a resin composition free of a metal compound as specified hereinbefore.

The resin composition of this invention can be used in the form of powders, chips, etc., which can be molded into various useful molded articles by compression molding, injection molding, extrusion molding and the like using conventional molding processes. Examples of molded articles which can be produced include gears, bearings, electrical component parts, containers and various other articles which are used widely in those fields where engineering plastics of high quality are required.

The following examples are given to illustrate this invention in greater detail. These examples should be considered, however, as merely exemplary and non-limiting. Unless otherwise indicated herein, all parts, percents, ratios and the like are by weight.

Following are methods of evaluating the bend strength of a thin-walled portion and the impact strength of a molded article.

(1) Method of Evaluating the Bend Strength of a Thin-Walled Portion

Figure 2:
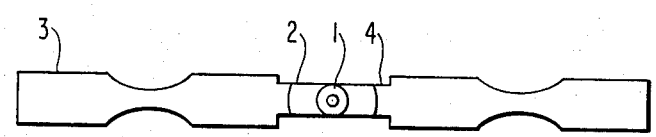
FIG. 2 is a plane view of the test piece.

With reference to FIGS. 1 and 2 of the accompanying drawings, 1 is a sprue of an injection molded article, 2 is a runner, 3 is a test piece and 4 is a gate. The runner has a diameter of 8 mm, the gate is 8 mm wide and 1 mm thick, the gate land (that portion of the gate in longitudinal direction) has a minimum length of 2 mm, and the test piece is a tensile impact piece of size S ⅛ inch thick as defined in ASTM D-1822. The test piece 3 as molded under given conditions is immediately subjected to bend test which comprises one upward bending and one downward bending of the test piece until it is normal to the runner 2 at the gate 4; complete breaking of the gate so that the test piece is disconnected from the runner is rated x, partial breaking which does not cause complete disconnection is rated Δ and no breaking is rated O, with the percentage of the rating O being defined as the gate non-break factor.

(2) Method of Evaluating the Impact Strength of a Molded Article

Figure 3:
FIG. 3 is a front view of a specimen from which a test piece for Dynstat impact testing is cut.
Figure 4:
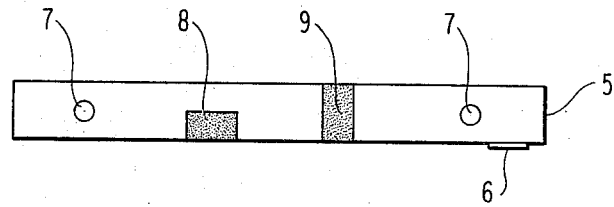
FIG. 4 is a plane view of the specimen.

As a result of studies on an evaluation method which most faithfully reproduces the cracking that may develop on a practical injection molded article upon impact, the present inventors have confirmed that Dynstat impact test (British Standard or BS 1330) that corresponds to an unnotched Izod impact test is more reliable that V-notched Izod impact test which is commonly employed for determining impact strength. Therefore, marks 7 were cut from between two ejector pins of a ¼"×5"×⅜" rod-like test piece 5 shown in FIGS. 3 and 4 of the accompanying drawing a ¼"×¼"×⅜" test piece (slightly modified from the dimensions defined in BS 1330) in a direction either parallel or vertical to the resin flow and measured the impact strength of the test piece with a Dynstat impact testing machine. In FIGS. 3 and 4, the numeral 6 represents a gate. The impact strengths as determined by using test pieces 8 and 9 are hereunder expressed as Iy and Ix, respectively; Iy represents an impact strength in a direction vertical to the resin flow, and Ix is an impact strength in a direction parallel to the resin flow. Impact strength was determined after drying at 100° C. for 16 hours. The calculation formula for impact strength was as follows:

$$\text{Impact Strength (kg} \cdot \text{cm/cm}^2) = \frac{\text{Breaking Energy (kg} \cdot \text{cm)}}{\text{Cross-Sectional Area of Specimen (cm}^2)}$$

Evaluation according to the above methods of an article molded from a resin composition consisting of PPES or PA only gave gate strength ration of O and a Dynstat impact strength more than 100 kg.cm/cm² both for Ix and Iy. On the other hand, an article molded from a blend of PPES and PA gave the rating x as gate strength and a Dynstat impact strength of about 10 kg.cm/cm² for both Ix and Iy. It was, therefore, clear that the blend had a weak point which could not be evaluated by Izod impact strength and that it was brittle at a thin-walled portion and low in impact strength. However, an article molded from a resin composition comprising the blend and 0.2 part by weight of cuprous iodide per 100 parts by weight of the composition gave the rating O as gate strength and a Dynstat impact strength of about 100 kg.cm/cm² or more for both Ix and Iy, suggesting absence of brittleness in the article.

EXAMPLES 1 TO 7 AND COMPARATIVE EXAMPLE 1

An aromatic polyester copolymer was prepared through interfacial polymerization of a solution in methylene chloride of a mixture of terephthaloyl dichloride and isophthaloyl dichloride (a molar ratio of 1:1) and a caustic soda aqueous solution (pH about 13.5) of bisphenol A. The copolymer had a logarithmic viscosity of 0.70 as measured at 25° C. in phenol/tetrachloroethane (a weight ratio of 6:4).

A resin composition was prepared by mixing the aromatic polyester copolymer with polycaprolactam (having a relative viscosity of 2.6 as measured at 25° C. in a 1% solution in 96% sulfuric acid) at a weight ratio of 1:1.

The composition obtained was homogeneously blended in a super mixer with cuprous iodine in each of the amounts specified in Table 1 below, the blend was vacuum dried at 100° C. for 8 hours, and extruded through an extruder at 280° C. Thereafter, test pieces of the configurations shown in FIGS. 1 to 4 were prepared using an injection molding machine at a cylinder temperature of 260° C. and a mold temperature of 80° C.

Evaluation of the characteristics of the test pieces is set forth in Table 1. The test pieces prepared according to this invention did not substantially differ from the control as far as their Izod impact strength was concerned but surprisingly enough, addition of cuprous iodide resulted in considerably high tensile impact strength, Dynstat impact strength and gate non-break factor.

EXAMPLES 8 TO 10 AND COMPARATIVE EXAMPLES 2 TO 4

The aromatic polyester copolymer used in Examples 1 to 7, polycaprolactam used in Examples 1 to 7 and cuprous chloride were blended together at the proportions set forth in Table 2 to prepare resin compositions. The procedure of Examples 1 to 7 was repeated for making chips of the compositions, making injection molded test pieces and for evaluating the performance of each test piece. The results are shown in Table 2 below.

TABLE 2

| | (A) Aromatic Polyester Copolymer (parts by weight) | (B) Polycaprolactam (parts by weight) | (C) Cuprous Chloride (parts by weight) | Tensile Impact Strength (kg · cm/cm$^2$) | Dynstat Impact Strength Ix (kg · cm/cm$^2$) | Dynstat Impact Strength Iy (kg · cm/cm$^2$) | Gate Non-Break Factor (%) | Izod Impact Strength (kg · cm/cm$^2$) |
|---|---|---|---|---|---|---|---|---|
| Comparative Example 2 | 65 | 35 | 0 | 55 | 13 | 17 | 0 | 7.5 |
| 3 | 50 | 50 | 0 | 70 | 20 | 13 | 0 | 5.0 |
| 4 | 35 | 65 | 0 | 45 | 15 | 20 | 0 | 4.3 |
| Example 8 | 65 | 35 | 0.1 | 185 | 115 | 110 | 100 | 6.8 |
| 9 | 50 | 50 | 0.1 | 210 | 100 | 107 | 100 | 7.5 |
| 10 | 35 | 65 | 0.1 | 195 | 115 | 105 | 100 | 6.0 |

As the table demonstrates, the Izod impact strengths of the test pieces prepared in Examples 8 to 10 were not substantially different from those of the controls but the former exhibited extremely improved tensile impact strength, Dynstat impact strength and gate non-break factor.

EXAMPLES 11 TO 25 AND COMPARATIVE EXAMPLE 5

The aromatic polyester copolymer used in Examples 1 to 7, polycaprolactam used in Examples 1 to 7 and the copper compounds specified in Table 3 were blended together at the proportions shown in the same table to prepare resin compositions. The procedure of Examples 1 to 7 was repeated for making chips of the compositions, making injection molded test pieces and for evaluating the performance of each test piece. The results are shown in Table 3.

Table 3 shows that copper halides, copper oxides and copper phosphates were especially effective; copper halides and phosphates were more effective than copper oxides because they did not give any undesired color to a molded article and, therefore, did not limit the scope of application of the article.

TABLE 1

| | (A) Aromatic Polyester Copolymer (parts by weight) | (B) Polycaprolactam (parts by weight) | (C) Cuprous Iodide (parts by weight) | Tensile*1 Impact Strength (kg · cm/cm$^2$) | Dynstat Impact Strength Ix (kg · cm/cm$^2$) | Dynstat Impact Strength Iy (kg · cm/cm$^2$) | Gate Non-Break Factor % | *2 Izod Impact Strength (kg · cm/cm$^2$) |
|---|---|---|---|---|---|---|---|---|
| Comparative Example 1 | 50 | 50 | 0 | 50 | 9 | 11 | 0 | 4.5 |
| Example 1 | " | " | 0.02 | 206 | 28 | 32 | 60 | 5.5 |
| 2 | " | " | 0.05 | 208 | 48 | 91 | 100 | 6.0 |
| 3 | " | " | 0.1 | 214 | 111 | 122 | 100 | 5.3 |
| 4 | " | " | 0.2 | 213 | 128 | 131 | 100 | 7.0 |
| 5 | " | " | 0.5 | 184 | 101 | 105 | 100 | 4.8 |
| 6 | " | " | 1 | 163 | 74 | 83 | 70 | 5.0 |
| 7 | " | " | 2 | 142 | 36 | 41 | 40 | 4.5 |

*1 ASTM D-1822, ⅛" thick
*2 ASTM D-256, ⅛" thick, V-notched

TABLE 3

| | (A) Aromatic Polyester Copolymer (parts by weight) | (B) Polycaprolactam (parts by weight) | (C) Metal Compounds Kind | Parts by Weight | Dynstat Impact Strength Ix (kg . cm/cm$^2$) | Iy (kg . cm/cm$^2$) | Color* Tone of Product |
|---|---|---|---|---|---|---|---|
| Comparative Example 5 | 50 | 50 | | 0 | 11 | 13 | 0 |
| Example 11 | " | " | cuprous chloride | 0.2 | 112 | 115 | 0 |
| 12 | " | " | cupric chloride | " | 100 | 125 | 0 |
| 13 | " | " | anhydrous cupric chloride | " | 114 | 120 | 0 |
| 14 | " | " | cuprous bromide | " | 100 | 106 | 0 |
| 15 | " | " | cuprous iodide | " | 125 | 135 | 0 |
| 16 | " | " | cupric oxide | " | 95 | 119 | x |
| 17 | " | " | copper phosphate | " | 98 | 101 | 0 |
| 18 | " | " | copper phosphite | " | 48 | 62 | Δ |
| 19 | " | " | copper pyrophosphate | " | 35 | 43 | 0 |
| 20 | " | " | copper sulfate | " | 41 | 73 | 0 |
| 21 | " | " | copper nitrate | " | 53 | 94 | x |
| 22 | " | " | copper carbonate | " | 18 | 25 | x |
| 23 | " | " | copper acetate | " | 40 | 31 | Δ |
| 24 | " | " | copper oxalate | " | 27 | 24 | Δ |
| 25 | " | " | copper stearate | " | 30 | 43 | 0 |

*0: No or faint coloration;
Δ: Relatively deep coloration;
x: Deep coloration

EXAMPLES 26 TO 36 AND COMPARATIVE EXAMPLE 6

The aromatic polyester copolymer used in Examples 1 to 7, polycaprolactam used in Examples 1 to 7 and the metal halides or oxides shown in Table 4 were blended together at the proportions shown in Table 4 to prepare resin compositions. The procedure of Examples 1 to 7 was repeated for making chips of the compositions, making injection molded test pieces and for evaluating the performance of each test piece. The results are shown in Table 4.

The table shows that every test piece prepared according to this invention had a Dynstat impact strength (for both Ix and Iy) than the control; the metal compounds used in Examples 26 to 30 were particularly effective.

TABLE 4

| | (A) Aromatic Polyester Copolymer (parts by weight) | (B) Polycaprolactam (parts by weight) | (C) Metal Compounds Kind | Parts by Weight | Dynstat Impact Strength Ix (kg . cm/cm$^2$) | Iy (kg . cm/cm$^2$) |
|---|---|---|---|---|---|---|
| Comparative Example 6 | 50 | 50 | | 0 | 12 | 14 |
| Example 26 | " | " | silver chloride | 0.2 | 62 | 75 |
| 27 | " | " | zinc chloride | " | 95 | 104 |
| 28 | " | " | aluminum chloride | " | 45 | 57 |
| 29 | " | " | stannous chloride | " | 42 | 48 |
| 30 | " | " | Sb$_2$O$_3$ | " | 45 | 51 |
| 31 | " | " | nickel dichloride | " | 18 | 24 |
| 32 | " | " | cobalt dichloride | " | 37 | 40 |
| 33 | " | " | ferrous chloride | " | 34 | 40 |
| 34 | " | " | manganese dichloride | " | 23 | 26 |
| 35 | " | " | molybdenum dichloride | " | 27 | 24 |
| 36 | " | " | vanadium dichloride | " | 20 | 22 |

EXAMPLES 37 TO 40 AND COMPARATIVE EXAMPLE 7

The aromatic polyester copolymer used in Examples 1 to 7, polycaprolactam used in Examples 1 to 7 and the metal oxides shown in Table 5 below were blended together at the proportions shown in Table 5 to prepare resin compositions. The procedure of Examples 1 to 7 was repeated for making chips of the compositions, making injection molded test pieces and for evaluating the performance of each test piece. The results are set forth in Table 5.

TABLE 5

| | (A) Aromatic Polyester Copolymer (parts by weight) | (B) Polycaprolactam (parts by weight) | (C) Sb$_2$O$_3$ (parts by weight) | (C) TiO$_2$ (parts by weight) | Tensile Impact Strength (kg . cm/cm$^2$) | Dynstat Impact Strength Ix (kg . cm/cm$^2$) | Iy (kg . cm/cm$^2$) | Gate Non-Break Factor (%) |
|---|---|---|---|---|---|---|---|---|
| Comparative Example 7 | 50 | 50 | 0 | 0 | 63 | 10 | 12 | 0 |
| Example 37 | " | " | 5 | 0 | 153 | 85 | 74 | 100 |

TABLE 5-continued

| (A) Aromatic Polyester Copolymer (parts by weight) | (B) Polycaprolactam (parts by weight) | (C) Sb₂O₃ (parts by weight) | (C) TiO₂ (parts by weight) | Tensile Impact Strength (kg·cm/cm²) | Dynstat Impact Strength | | Gate Non-Break Factor (%) |
|---|---|---|---|---|---|---|---|
| | | | | | Ix (kg·cm/cm²) | Iy (kg·cm/cm²) | |
| 38 | " | " | 10 | 0 | 95 | 68 | 70 | 60 |
| 39 | " | " | 0 | 10 | 85 | 54 | 47 | 100 |
| 40 | " | " | 0 | 20 | 52 | 38 | 43 | 70 |

The table shows that Sb₂O₃ and TiO₂ proved especially effective when they were used in a relatively large amount. In spite of the general understanding that addition of a large amount of inorganic filler to plastics results in reduced impact characteristics, the metal oxides provided improved impact characteristics and increased gate non-break factor.

The test piece of Comparative Example 7 and that of Example 40 were irradiated with ultraviolet rays in a weatherometer; the former developed extreme yellowing but the latter was substantially free from the defect.

EXAMPLES 41 TO 43

The aromatic polyester copolymer used in Examples 1 to 7, polycaprolactam used in Examples 1 to 7 and cuprous iodide and/or Sb₂O₃ were blended together at the proportions specified in Table 6 below to prepare resin compositions. The procedure of Examples 1 to 7 was repeated for making chips of the compositions, making injection molded test pieces and for evaluating the performance of each test piece. The results are shown in Table 6. As it shows, combination of cuprous iodide and antimony oxide was not only effective in improving the mechanical characteristics and heat resistance characteristics of resin compositions but it completely prevented bluing of the compositions even when they absorbed water.

What is claimed is:

1. A resin composition consisting essentially of (A) an aromatic copolyester comprising the reaction product in about equimolar amounts of (1) a mixture of terephthalic acid and isophthalic acid and/or the functional derivatives thereof with the terephthalic acid unit to the isophthalic acid unit molar ratio being about 9:1 to about 1:9 and (2) a bisphenol of the general formula (I):

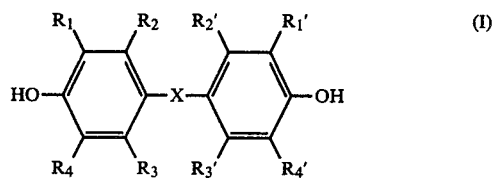

wherein —X— represents a member selected from the group consisting of —O—, —S—, —SO₂—, —SO—, —CO—, an alkylene group containing 1 to 5 carbon atoms and an alkylidene group containing 1 to 5 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 5 carbon atoms, and/or a derivative thereof;

(B) a polyamide containing therein a repeating unit of the following general formula (II):

or (III):

TABLE 6

| | (A) Aromatic Polyester Copolymer (parts by weight) | (B) Polycaprolactam (parts by weight) | (C) Cuprous Iodide (parts by weight) | (C) Sb₂O₃ (parts by weight) | Tensile Impact Strength (kg·cm/cm²) | Dynstat Impact Strength | | Gate Non-Break Factor (%) | Tensile Impact Strength after Heating at 150° C. for 96 Hours (kg·cm/cm²) | Bluing* after Heating with Hot Water at 80° C. for 96 Hours |
|---|---|---|---|---|---|---|---|---|---|---|
| | | | | | | Ix (kg·cm/cm²) | Iy (kg·cm/cm²) | | | |
| Comparative Ex. 1 | 50 | 50 | 0 | 0 | 50 | 9 | 11 | 0 | 23 | 0 |
| Ex. 2 | " | " | 0.05 | 0 | 208 | 48 | 91 | 100 | 106 | X |
| 3 | " | " | 0.1 | 0 | 214 | 111 | 122 | 100 | 145 | XX |
| 4 | " | " | 0.2 | 0 | 213 | 128 | 131 | 100 | 153 | XX |
| 37 | " | " | 0 | 5 | 153 | 85 | 74 | 100 | 67 | 0 |
| 41 | " | " | 0.05 | 2 | 196 | 117 | 133 | 100 | 135 | 0 |
| 42 | " | " | 0.1 | 2 | 210 | 108 | 141 | 100 | 164 | 0 |
| 43 | " | " | 0.2 | 2 | 204 | 114 | 137 | 100 | 172 | 0 |

*Degree of bluing
0:No bluing;
Δ:Slight bluing;
X:Distinct bluing;
XX:Extreme bluing While the invention has been described in detail and with reference to specific embodiments thereof, it will be apparent to one skilled in the art that various changes and modifications can be made therein without departing from the spirit and scope thereof.

-continued $$+C-R_6-C-N-R_7-N+_n \quad (III)$$
(with O, O, H, H above respectively)

wherein R$_5$, R$_6$ and R$_7$, which may be the same or different, each represents an alkylene group containing 4 to 11 carbon atoms and n is an integer of from 30 to 500 and (C) an oxide of or an inorganic or organic salt of a metal of Groups IVB, VB, VIB, VIIB, VIII, IB, IIB, IIIA, IVA or VA of the Periodic Table said aromatic copolyester (A) and said polyamide (B) being present in a weight ratio ranging from about 9:1 to about 1:9.

2. The resin composition of claim 1, wherein said metal is a metal of Groups IB, IIB, IIIA, IVA and VA of the Periodic Table.

3. The resin composition of claim 1, wherein said bisphenol of the general formula (I) is selected from the group consisting of 4,4'-dihydroxy-diphenyl ether, bis(4-hydroxy-2-methylphenyl)ether, bis(4-hydroxy-3-chlorophenyl)ether, bis(4-hydroxyphenyl)-sulfide, bis(4-hydroxyphenyl)sulfone, bis(4-hydroxyphenyl)-ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)-propane, 1,1-bis(4-hydroxyphenyl)-n-butane and 2,2-bis(4-hydroxyphenyl)propane.

4. The resin composition of claim 1, wherein said polyamide is selected from the group consisting of polyhexamethylene adipamide, polycaprolactam, polyhexamethylene sebacamide, polydecamethylene adipamide, polyaminoundecanoic acid and polylaurolactam.

5. The resin composition of claim 1, wherein said metal is selected from the group consisting of copper, silver, zinc, cadmium, mercury, aluminum, tin, lead, antimony, bismuth, nickel, cobalt, iron, manganese, molybdenum, vanadium, and titanium.

6. The resin composition of claim 1, wherein said metal oxide or salt (C) is a metal halide, a metal oxide, a nitrate, a sulfate, a phosphate, a carbonate, an acetate, a stearate or a maleate.

7. The resin composition of claim 6, wherein said metal oxide or salt (C) is a metal halide or a metal oxide.

8. The resin composition of claim 1, wherein said metal metal oxide or salt (C) is selected from the group consisting of cuprous chloride, cupric chloride, cuprous bromide, cupric bromide, cuprous iodide, cupric iodide, cuprous oxide, cupric oxide, copper phosphate, silver chloride, silver bromide, silver iodide, silver oxide, zinc chloride, TiO, Ti$_2$O$_3$, TiO$_2$, Sb$_2$O$_3$ and Sb$_2$O$_5$.

9. The resin composition of claim 1, wherein said mixture of terephthalic acid and isophthalic acid is 30 to 70 mol% terephthalic acid and/or its derivative and 70 to 30 mol% isophthalic acid and/or its derivative.

10. The resin composition of claim 1, wherein the bisphenol of the general formula (I) is 2,2-bis(4-hydroxyphenyl)propane.

11. The resin composition of claim 1, wherein the polyamide (B) is polycaprolactam.

12. The resin composition of claim 1, wherein the metal oxide or salt (C) is a copper oxide or salt.

13. The resin composition of claim 1, wherein the metal oxide or salt (C) is a silver oxide or salt.

14. The resin composition of claim 1, wherein the metal oxide or salt (C) is a zinc oxide or salt.

15. The resin composition of claim 1, wherein the metal oxide or salt (C) is a metal halide.

16. The resin composition of claim 15, wherein the metal halide is a copper halide.

17. The resin composition of claim 16, wherein the copper halide is selected from the group consisting of cuprous chloride, cupric chloride, cuprous bromide, cupric bromide, cuprous iodide and cupric iodide.

18. The resin composition of claim 15, wherein the metal halide is a silver halide.

19. The resin composition of claim 15, wherein the metal halide is a zinc halide.

20. The resin composition of claim 1, wherein the metal oxide or salt (C) is a metal oxide.

21. The resin composition of claim 1, wherein said aromatic copolyester (A) and said polyamide (B) are present at a weight ratio ranging from 3:7 to 7:3.

22. The resin composition of claim 1, which contains 0.001 to 25 parts by weight of said metal oxide or salt (C) per 100 parts by weight of the sum of said aromatic copolyester (A) and said polyamide (B).

23. The resin composition of claim 1, which contains 0.001 to 5 parts by weight of said metal or salt (C) per 100 parts by weight of the sum of said aromatic copolyester (A) and said polyamide (B).

24. The resin composition of claim 1, which contains 0.01 to 0.5 parts by weight of said metal oxide or salt (C) per 100 parts by weight of the sum of said aromatic copolyester (A) and said polyamide (B).

25. The resin composition of claim 1, wherein the metal oxide or salt (C) is Sb$_2$O$_3$ and said Sb$_2$O$_3$ is present in an amount of 0.1 to 15 parts by weight per 100 parts by weight of the sum of said aromatic copolyester (A) and said polyamide (B).

26. The resin composition of claim 1, wherein the metal oxide or salt (C) is a titanium oxide and said titanium oxide is present in an amount of 5 to 25 parts by weight per 100 parts by weight of the sum of said aromatic copolyester (A) and said polyamide (B).

27. The resin composition of claim 1, wherein the metal oxide or salt (C) is a mixture of a copper oxide or salt and an antimony oxide or salt.

28. The resin composition of claim 27, wherein the copper oxide or salt (C) is a copper halide and the antimony oxide or salt is an antimony oxide.

* * * * *